United States Patent [19]

Royer

[11] Patent Number: 5,102,179

[45] Date of Patent: Apr. 7, 1992

[54] HUNTER'S BLIND

[76] Inventor: Jerry L. Royer, Rte. 2, Box 441-B, Ragley, La. 70657

[21] Appl. No.: 690,280

[22] Filed: Apr. 24, 1991

[51] Int. Cl.$^5$ .............................................. B60P 3/00
[52] U.S. Cl. ...................................... 296/26; 296/27; 296/171; 296/173; 296/175; 182/63; 182/141; 187/9 R; 43/1
[58] Field of Search .................. 296/26, 27, 171, 173, 296/175; 182/63, 141, 148; 187/9 R; 43/1

[56] References Cited

U.S. PATENT DOCUMENTS

| | | | |
|---|---|---|---|
| 4,412,398 | 11/1983 | Harmon | 43/1 |
| 4,529,063 | 7/1985 | Kishi | 187/9 R X |
| 4,719,716 | 1/1988 | Chrisley, Jr. | 43/1 |

FOREIGN PATENT DOCUMENTS

| | | | |
|---|---|---|---|
| 1282479 | 11/1968 | Fed. Rep. of Germany | 296/27 |
| 2354899 | 2/1978 | France | 296/171 |
| 0953150 | 8/1982 | U.S.S.R. | 182/141 |

Primary Examiner—Dennis H. Pedder
Attorney, Agent, or Firm—Richard C. Litman

[57] ABSTRACT

A hunter's blind having hinged walls which may be fastened together when in a vertical position and compactly stored when in a horizontal position, a connecting roof, ball rollers cooperating with openings in leg sections to raise and lower the hunter's blind, stabilizing cables being payed out and taken up simultaneously with the raising and lowerig of the hunter's blind, and controls located within the hunter's blind to enable the user to control the raising and lowering of the hunter's blind and the deployment of the stabilizing cables while remaining within the blind.

10 Claims, 5 Drawing Sheets

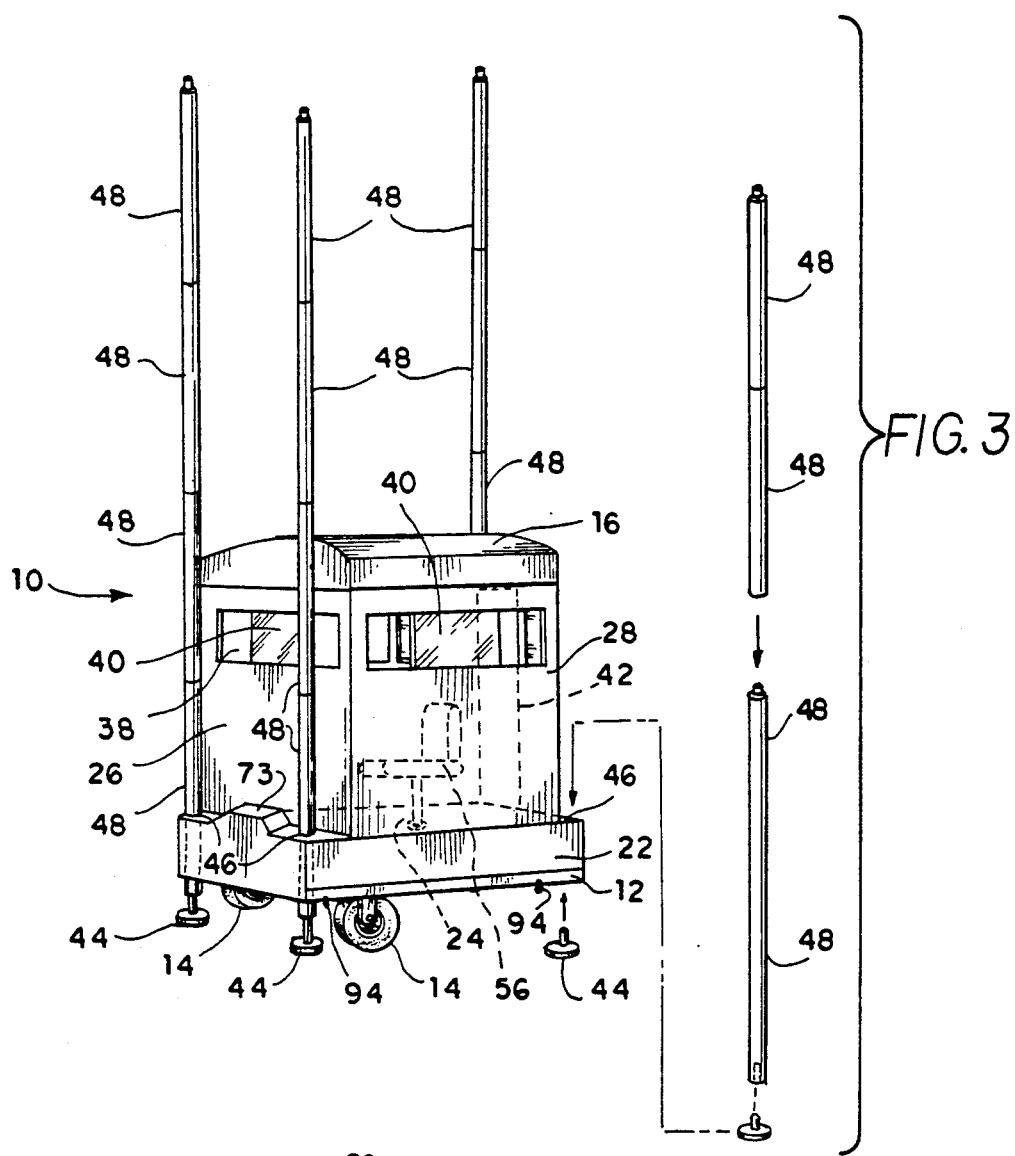
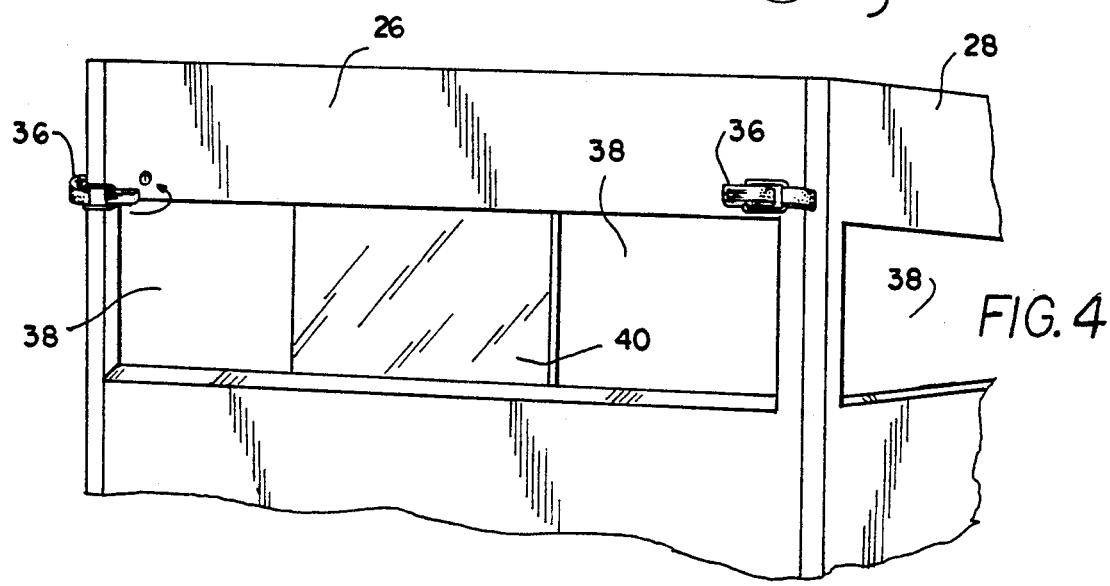

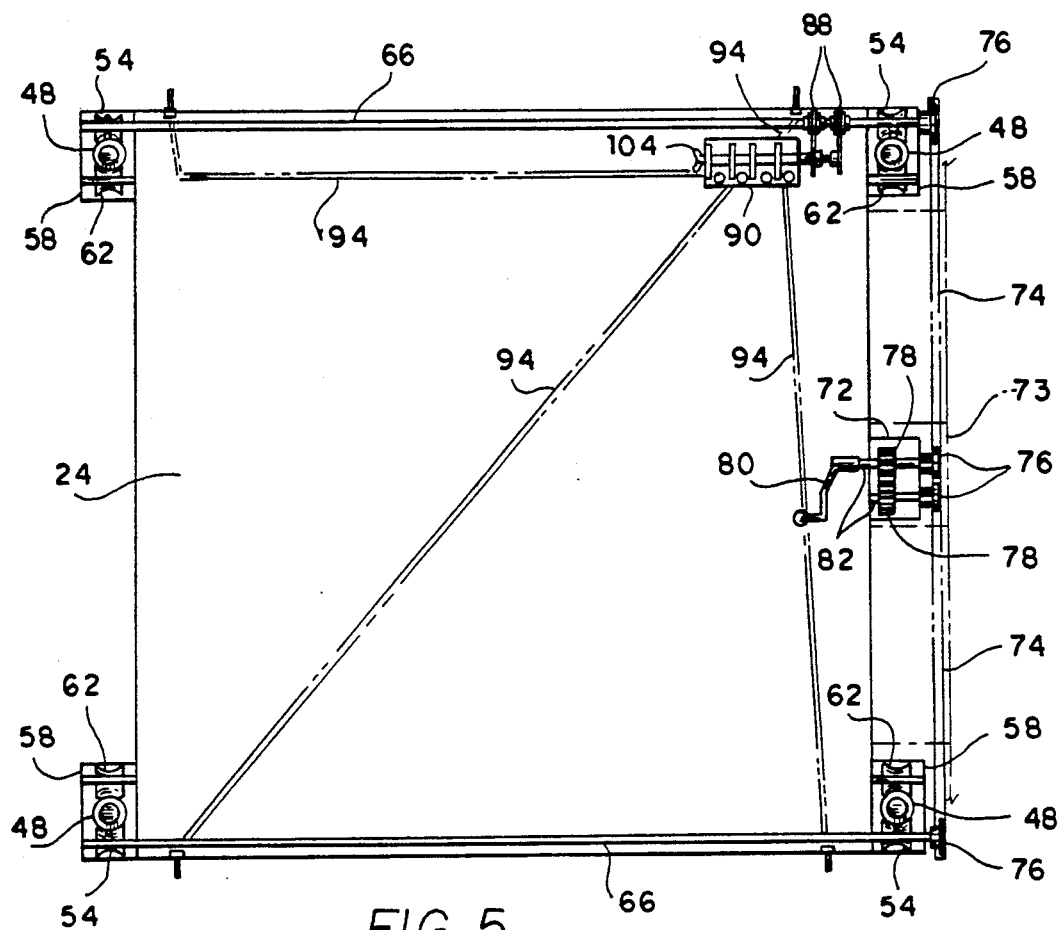
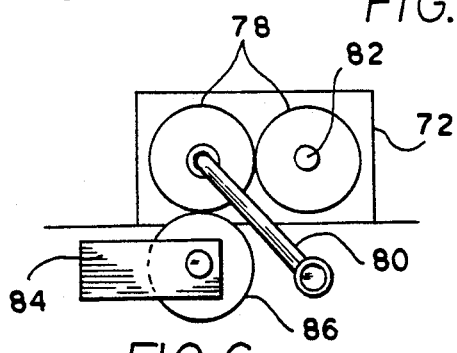
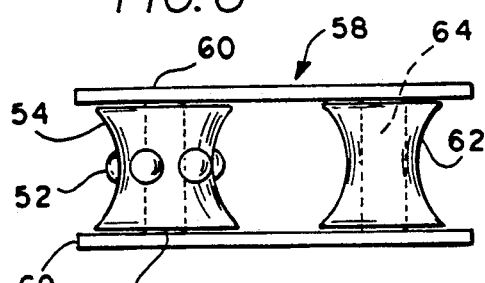
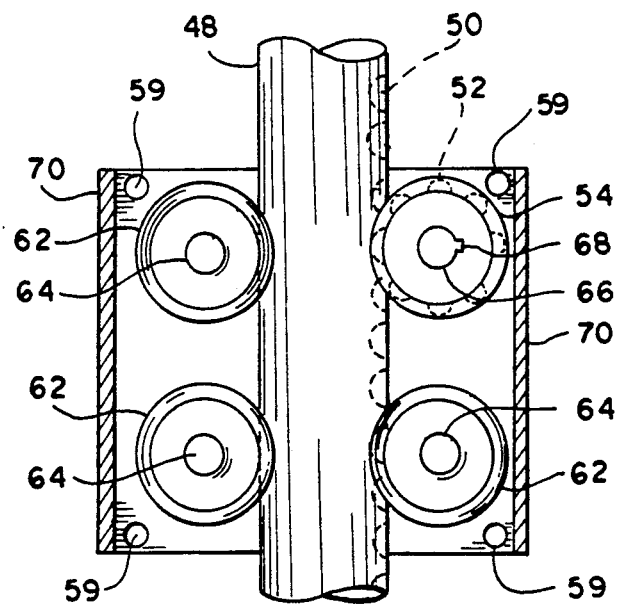
FIG. 5
FIG. 6
FIG. 7
FIG. 8

HUNTER'S BLIND

BACKGROUND OF THE INVENTION

1. Field of the Invention

This invention relates to a hunter's blind which is portable, easily assembled in the field, and which can be raised and lowered relative to and independent of the ground by control elements located within the hunter's blind.

2. Description of Related Prior Art

Hunters' blinds are well known. Johnson C. McClaran U.S. Pat. No. 2,854,705 issued on Oct. 7, 1958, Alvin E. Harmon U.S. Pat. No. 4,412,398 issued on Nov. 1, 1983, Charles F. Reneau U.S. Pat. No. 4,606,142 issued on Aug. 19, 1986, and Tom H. Chrisley, Jr. U.S. Pat. No. 4,719,716 issued on Jan. 19, 1988 are representative of the hunters' blinds known in the prior art. In each of the above-cited patents the hunters' blinds are constructed and raised into operating position with the user remaining outside of the blind. Once in position, the user climbs up a ladder to gain entrance into the blind by means of a trap door. Only the patent to Christley, Jr. uses a motorized or hand cable crank or winch to raise the hunter's blind, with the user remaining outside the blind.

Ralph W. Hutchens, Sr. U.S. Pat. No. 3,548,970 issued on Dec. 22, 1970 and Delbert Ready U.S. Pat. No. 4,294,332 issued on Oct. 13, 1981 each disclose a motorized means for vertically raising such items as scaffolding while the users remain on the scaffolding.

SUMMARY AND OBJECTS OF THE INVENTION

It is an object of this invention to provide a portable hunter's blind which is easily erected by one person in about 5 minutes, is compact and easily stored in its collapsed state, and can be moved to an erection site easily with a three-wheel or a four-wheel all terrain vehicle (ATV).

It is another object of this invention to provide a portable hunter's blind with controls within the blind to effect raising and lowering of the blind while the user is in the blind.

The hunter's blind of this invention is mounted on two trailer wheels for transport. The hinged walls, mounted on the trailer base, can be rotated to a vertical position and then snapped together. A roof portion is then added. Subsequently, screw anchors are inserted into the ground, and stabilizing cables are suitably attached to these anchors. The stabilizing cables spool out when the hunter's blind is raised and recoil during descent. Four legs each having a series of holes therein are located one on each corner of the blind. Four ball gears, connected by a series of shafts, chains and sprockets to a hand crank or a 12-Volt motor located inside the blind, engage the series of holes, whereby the blind may be raised or lowered while the user is inside the hunter's blind.

Other objects, features and advantages of this invention will be apparent from the following detailed description and the appended claims, reference being had to the accompanying drawings forming a part of the specification, wherein like reference numerals designate corresponding parts of the several views.

BRIEF DESCRIPTION OF THE DRAWINGS

FIG. 3 is a perspective view showing a later stage wherein leveling jacks and leg sections have been added.

FIG. 4 is a view showing latch means holding the vertical wall sections in position.

FIG. 5 is a top plan somewhat diagrammatic view showing the relationship between the climbing blocks, cable spooling drum and the primary gearbox.

FIG. 6 is a side view of the primary gearbox showing an alternative use of a motor to drive the gears in the primary gearbox.

FIG. 7 is an end view of the climbing block.

FIG. 8 is a sectional side view of an end block mounted on a leg.

DETAILED DESCRIPTION OF THE PREFERRED EMBODIMENT

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not limitation.

Figure 1:
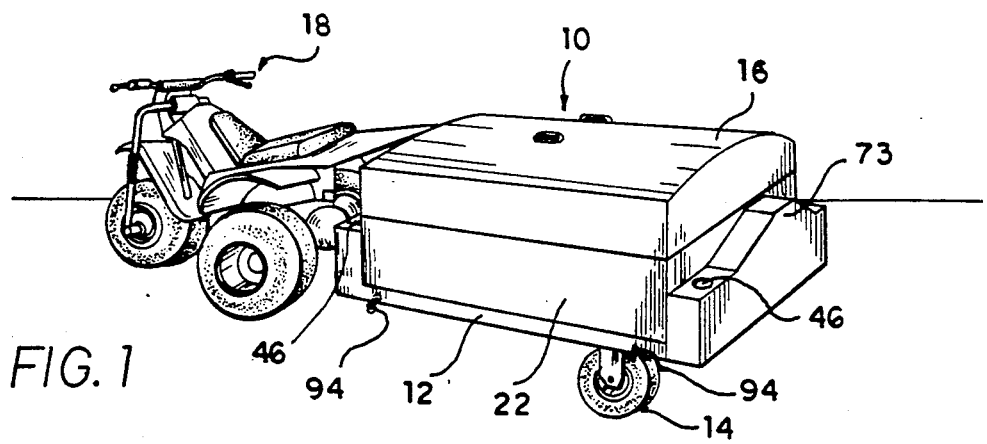
FIG. 1 is a perspective view showing the hunter's blind compactly collapsed to enable transport to a hunting location.

FIG. 1 illustrates the means for transporting my hunter's blind to a hunting location. The hunter's blind, generally identified by reference numeral 10, is shown to be compactly stored for transportation on a base 12 mounted on two trailer wheels 14 roof 16 providing a protective cover for the other parts of hunter's blind 10 described below. Base 12 can be connected to a conventional all terrain vehicle (ATV) 18 by way of a conventional trailer hitch 20. Mounted on base 12 is an enclosure 22 which provides an enclosed area for the climbing mechanism and the cable stabilizing mechanism described below, the enclosed area being covered by a floor 24 for the hunter's blind.

Figure 2:
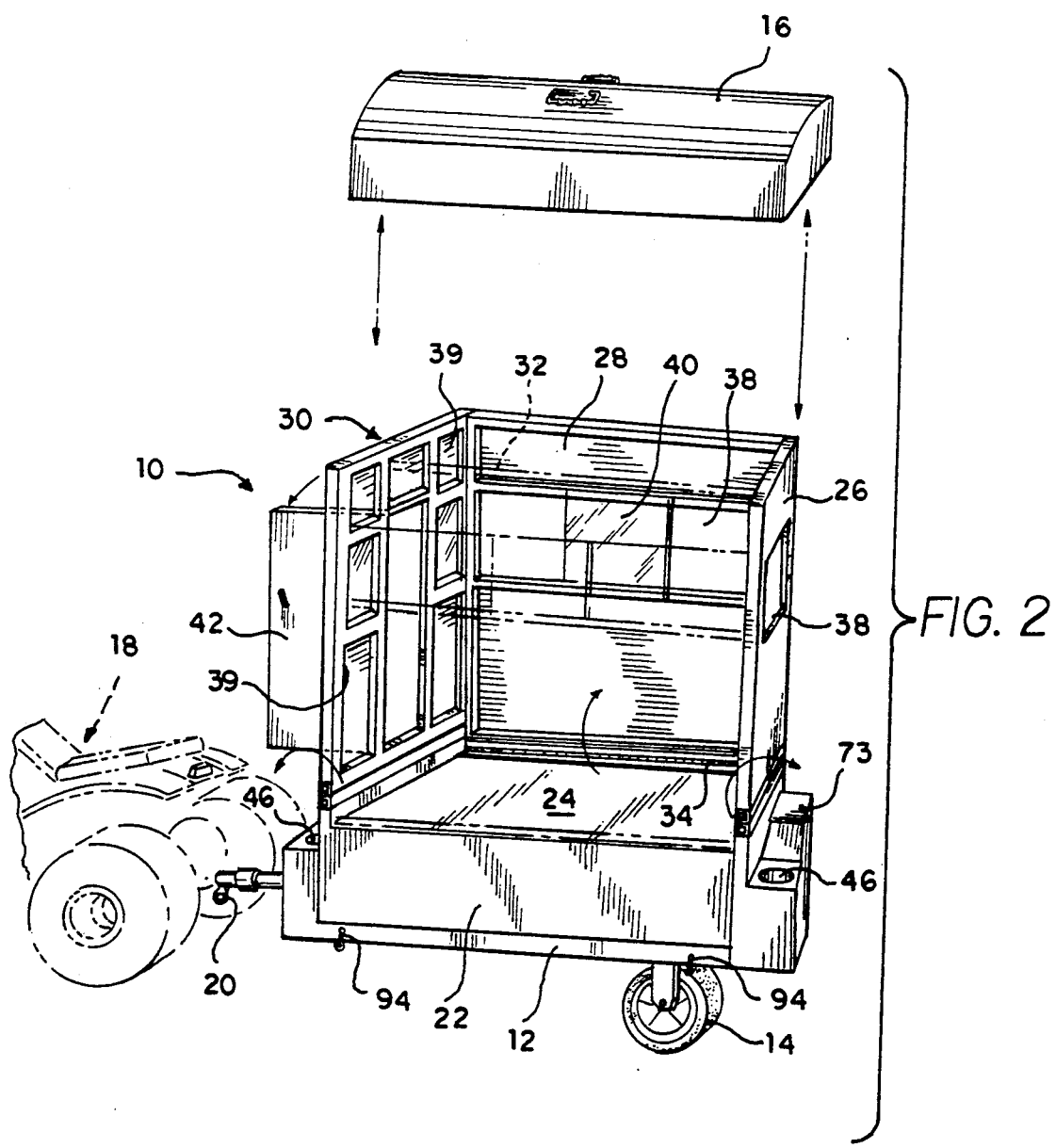
FIG. 2 is a perspective view showing the hunter's blind partially erected at a hunting location.

FIG. 2 shows a rear wall 26, a front wall 30 and a right side wall 28 in the vertical position, and a fourth wall or left side wall 32 in phantom. Walls 26, 28, 30 and 32 are hinged to enclosure 22 by hinges 34, and are held together in the vertical position by conventional snap fasteners 36 as shown for walls 26 and 28 in FIG. 4. Walls 26, 28 and 32 are provided with window openings 38 which may include slidable transparent plastic windows 40 offering protection against the elements if desired. Wall 30 is provided with window openings 39 and a door 42 which provides easy entrance into and exit from hunter's blind 10.

After walls, 26, 28, 30 and 32 have been erected and snapped together as shown in FIGS. 2 and 4, roof 16 is placed in position over the tops of walls 26, 28, 30 and 32 as shown in FIGS. 2 and 3. Thereafter, leveling jacks 44 are placed in openings 46 from the bottom thereof as shown in FIG. 3. Leg sections 48 are then screwed together and inserted through the top of openings 46 to mate with respective leveling jacks 44. Leg sections 48 have a plurality of openings 50 configured to cooperate with semispherical protrusions 52 on climbing ball roller or gear 54 as shown in FIG. 8, for a purpose explained below. If desired, a chair 56 may be suitably mounted on floor 24.

FIGS. 7 and 8 show the construction of a climbing block assembly 58, which comprises two side plates 60 with rollers 54 and 62 mounted between said side plates 60. Rollers 62 are guide or support rollers mounted on pivot shafts 64 which connect side plates 60 together. Climbing ball rollers or gears 54 are fixedly mounted on drive shafts 66,66 as by means of a key 68 so as to rotate with drive shafts 66,66. Plates 60 may be connected to front and rear guard plates 70 shown in section in FIG. 8 if found to be desirable. Climbing block assemblies are suitably attached as by bolts (not shown) through bolt holes 59 to the respective corners of the hunter's blind 10.

Shafts 66 are connected to a primary gearbox 72 through timing chains 74 and sprockets 76, as shown in FIG. 5. Primary gearbox 72 has two mating gears 78,78 connected so as to simultaneously rotate shafts 66 and consequently climbing ball rollers or gears 54 in a direction to raise or lower hunter's blind 10. A crank 80 is detachably mounted on one of the shafts 82 supporting gears 78. Crank 80 can be rotated manually to drive shafts 66 and climbing ball rollers or gears 54 in a direction to raise or lower hunter's blind 10. As an alternative, a 12-Volt motor 84 carrying a gear 86 which meshes with gear 78 may be used instead of manually operated hand crank 80 to rotate gears 78. Any suitable means may be used to prevent rotation of gears 78 when found to be desirable as by means of a latch for crank 80 (not shown) or a conventional magnetic brake (not shown) acting on shafts 82.

Figure 12:
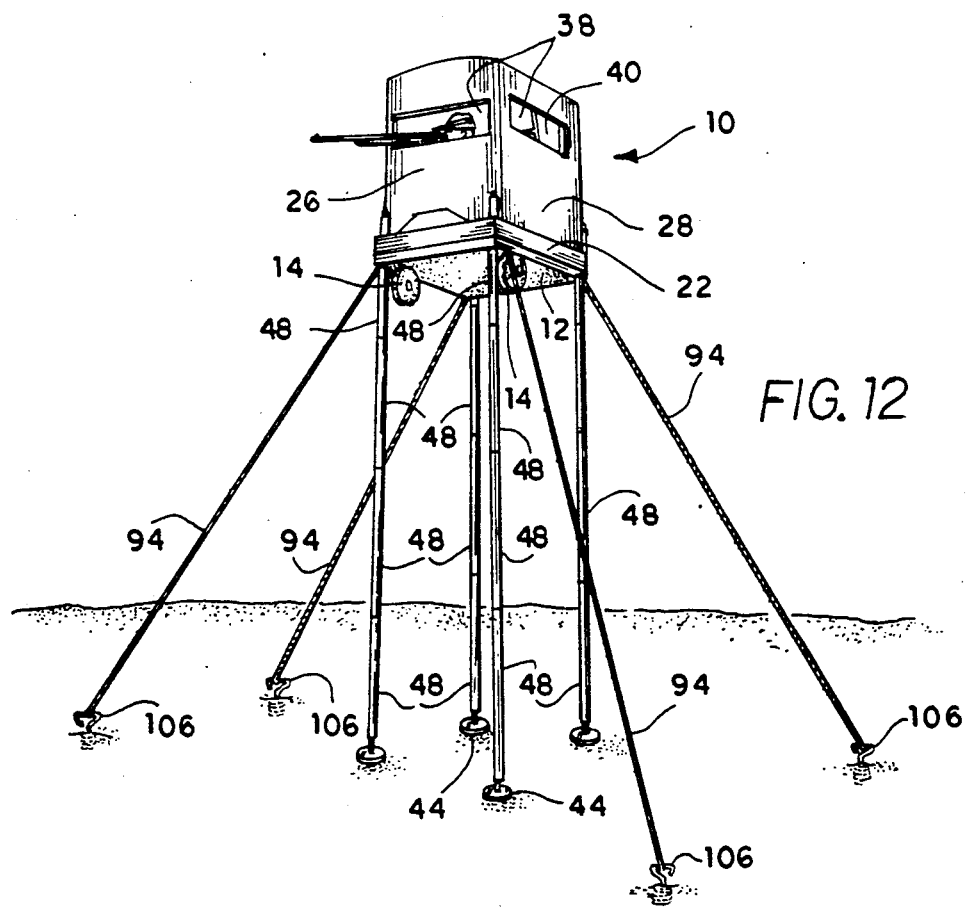
FIG. 12 is a perspective view of the hunter's blind in a raised position with stabilizing cables extended to stabilize the hunter's blind.

Also mounted on one of the shafts 66 are two oppositely directed unidirectional ratchet clutches 88 effective to transfer rotation of said one shaft 66 to cable spooling drum 90. Cable spooling drum 90 comprises four cable spools 92 which carry four stabilizing cables 94 which are payed out as the hunter's blind 10 rises, and which are reeled in as the hunter's blind 10 is lowered to the ground. Cable spools 92 are overdriven or underdriven, depending on the direction of drive, to keep each of the cables 94 taut, and are connected together on a common drive shaft 96 by means of friction clutches 98. Cable spools 92 are free to rotate and longitudinally slide on shaft 96, while friction clutches 98 are connected to rotate with shaft 96 but are longitudinally slidable relative to shaft 96 through keys 142 on shaft 96 and keyways 144 provided in friction clutches 98. Cable spools 92 and drive shaft 96 are mounted in a frame 100 in turn mounted in enclosure 22. Frame 100 has a screw-threaded opening 102 to receive a screw-threaded cable spool clutch pressure adjustment means 104. Friction clutches 98 permit the stabilizing cables 94 to be spooled out at different rates. The ends of the power stabilizing cables 94 are connected respectively to four anchor screws 106 which are embedded into the ground as shown in FIG. 12. The cables 94 exit cable spooling drum 90 through openings 108 in frame 100.

Figure 11:
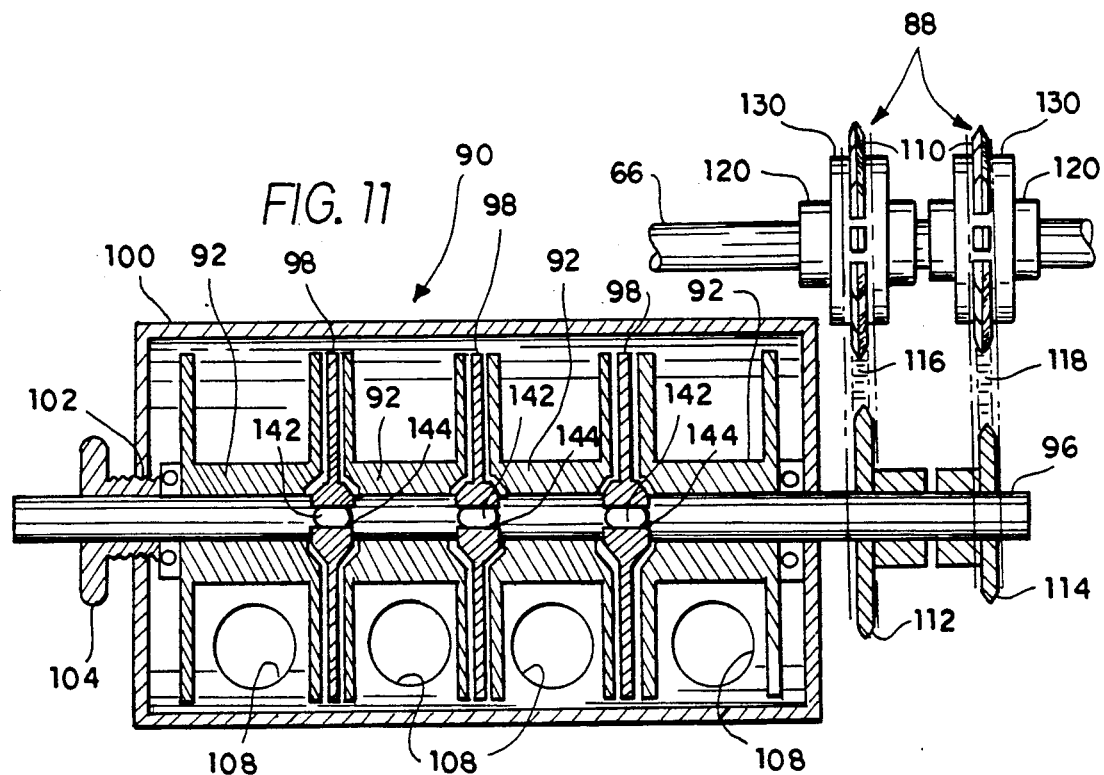
FIG. 11 is an enlarged view of the cable spooling drum and controlling ratchet sprockets.

Ratchet clutches 88 connect shaft 66 with drive shaft 96 through sprockets 110 mounted on ratchet clutches 88, 112 and 114 mounted on shaft 96, and drive chains 116 and 118 connecting sprockets 110, 112 and 114 as shown in FIG. 11.

Figures 9, 10:
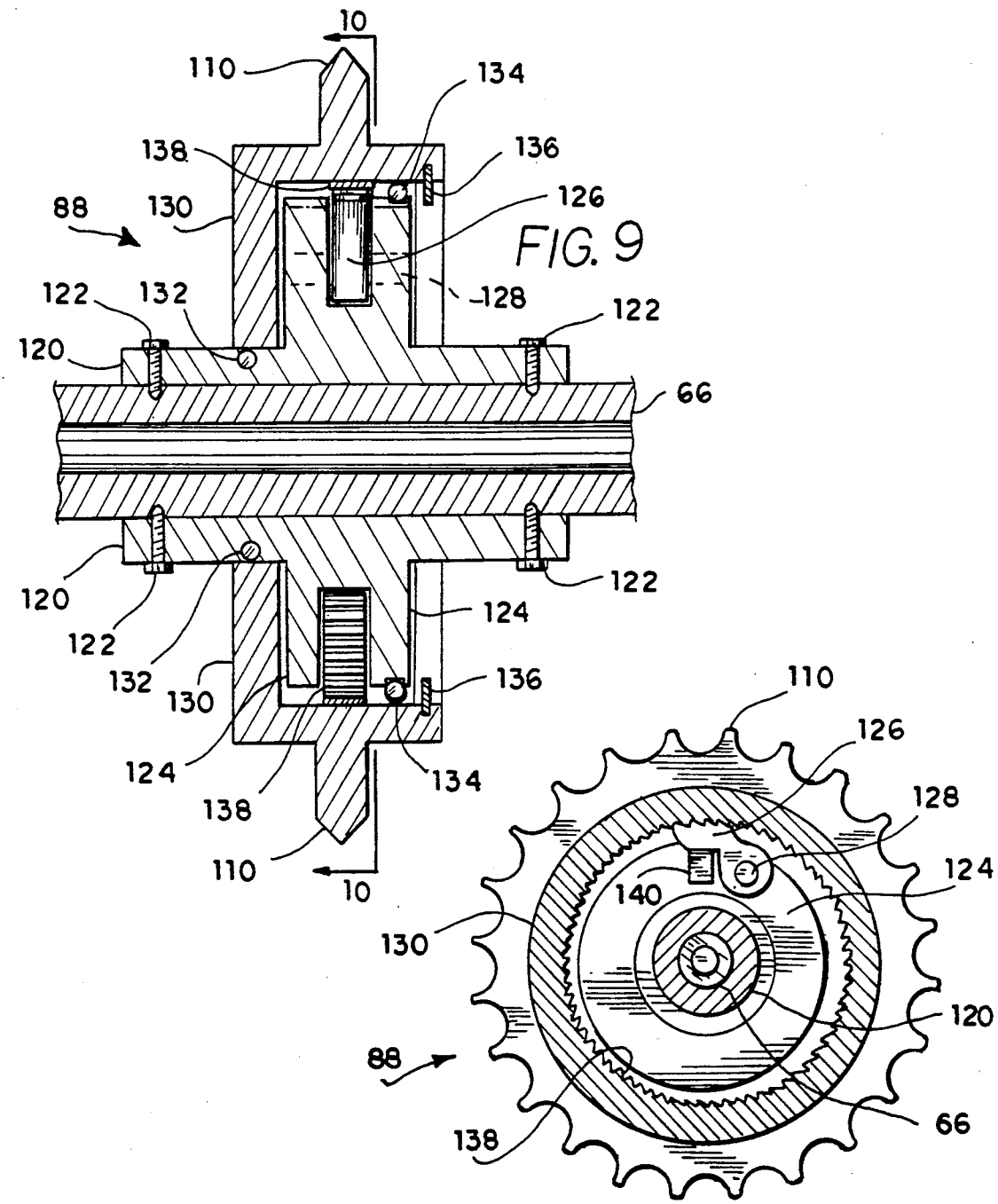
FIG. 9 is a sectional end view of a ratchet sprocket for controlling the operation of the climbing blocks and the cable spooling drum.
FIG. 10 is a sectional view of a ratchet sprocket, taken along line 10—10 in FIG. 9.

FIGS. 9 and 10 show the construction of one of the two ratchet clutches 88. Inner hub 120 is mounted on shaft 66 by screws 122 so as to rotate with shaft 66. Inner hub 120 has integral therewith two spaced flange portions 124 between which is mounted a pawl 126 on a pivot shaft 128. Mounted on inner hub 120 is an outer hub 130 which has sprocket 110 integral therewith. Hub 130 is frictionally engaged with inner hub 120 through O-rings 132 and 134. Snap ring 136 retains hub 130 on hub 120 through engagement with the side wall of outer flange 124.

Hub 130 is provided with internal ratchet teeth 138 which are circumferentially located to be engaged by pawl 126 which is biased by spring 140 to engage teeth 138 continuously. In FIG. 10, when shaft 66 is driven counterclockwise through operation of crank 80 or motor 84, pawl 126 engages teeth 138 and thereby drives sprocket 110 in the same counterclockwise direction. This in turn drives shaft 96 in the same counterclockwise direction through the cooperation of drive chains 116 and 118, and sprockets 112 and 114.

When shaft 66 is rotated in the clockwise direction, the tip of pawl 126 will simply ride over the teeth 138 of sprocket 110 if there is any relative movement therebetween. The second ratchet clutch 88 shown in FIGS. 5 and 11 function in the same way as described above for the first ratchet clutch, except that the direction of engagement between pawl 126 and teeth 138 is reversed so as to permit driving engagement during clockwise rotation of shaft 66 in FIG. 10 and to preclude driving engagement during counterclockwise rotation of shaft 66.

To summarize the operation of the climbing mechanism and cable stabilizing mechanism, once the hunter's blind 10 has been erected, the user will rotate gears 78 from within the blind either manually by means of crank 80 or by power through motor 84. Such rotation will drive sprockets 76 and shafts 66 which in turn will rotate climbing ball rollers or gears 54. Rollers or gears 54 will then "climb" up leg sections 48 through the engagement of protrusions 52 with leg openings 50 until blind 10 reaches the desired height, as shown in FIG. 12. Simultaneously with the climbing operation, cables 94 are unrolled from cable spools 92 through the operation of ratchet clutches 88 and sprockets 110, 112, and 114. The provision of friction clutches 98 between spools 92 allows the stabilizing cables 94 to be payed out at different rates, depending upon the location of anchor screws 106, while retaining each of the cables 94 under tension. To return the hunter's blind 10 to the ground the user merely reverses the above-described process. It should be noted that the user remains inside the hunter's blind 10 throughout the raising and lowering of the blind. In the hunters + blinds disclosed in the prior art cited above, the user remains outside the blind during the process of raising and lowering the blind and must use a ladder or the like to gain access to the blind after it has been raised, and to leave the blind before it is lowered.

While it will be apparent that the preferred embodiment of the invention herein disclosed is well calculated to fulfill the objects above-stated, it will be appreciated that the invention is susceptible to modification, variation and change without departing from the proper scope or fair meaning of the subjoined claims.

I claim:

1. A portable hunter's blind comprising:

front wall means, rear wall means, left side wall means, and right side wall means hingedly connected to a base means, whereby each said wall means may be moved from a horizontal position to a vertical position on said base means;

fastener means attached to said front wall means, said rear wall means, said left side wall means, and said right side wall means, for fastening together said front wall means, said rear wall means, said left side wall means, and said right side wall means when moved to the vertical position;

roof means which fits over said front wall means, said rear wall means, said left side wall means, and said right side wall means in both the horizontal position and the vertical position of each said wall means;

at least two wheel means mounted on said base means;

window means in said front wall means, rear wall means, left side wall means, and right side wall means;

door means in said front wall means whereby a user can gain entry into the hunter's blind;

climbing means connected to said hunter's blind for raising and lowering the hunter's blind;

stabilizing means connected to said hunter's blind for stabilizing said hunter's blind in the raised position;

operating means connected to said climbing means and said stabilizing means for operating said climbing mean and said stabilizing means; and actuating means for actuating said operating means; said actuating means being located inside said hunter's blind;

whereby a user can raise and lower said hunter's blind from inside said hunter's blind.

2. A portable hunter's blind as in claim 1, said climbing means comprising:

a climbing block assembly means fixedly connected to said hunter's blind at each of four corners of said hunter's blind on said base means;

each said climbing block assembly means comprising two side plate means connected together in spaced apart fashion to provide support for a climbing ball roller means and support roller means, said climbing ball roller means having hemispherically configured protrusion means thereon;

drive shaft means for driving said climbing ball roller means;

leveling jack means located at each of said four corners of said hunter's blind; and leg section means placed in openings at each of said four corners of said hunter's blind and connected to said leveling jack means, said leg section means having openings therein which cooperate with said protrusion means; whereby when said drive shaft means are rotated said climbing ball roller means engage said leg section openings to drive said climbing block assembly means and said hunter's blind attached thereto in a vertical direction dependent upon the direction of rotation of said drive shaft means, to thereby raise and lower said hunter's blind as desired.

3. A portable hunter's blind as in claim 2, wherein: said climbing block assembly means and said drive shaft means are located in an enclosure means mounted on said base means.

4. A portable hunter s blind as in claim 3, said stabilizing means comprising:

a cable spooling drum means mounted in said enclosure means and supporting at least four cable spool means in a frame means, each said cable spool means supporting a stabilizing cable means, each of said cable means having ends exiting said hunter's blind at a respective corner of said hunter's blind, the ends of said cable means being connected to anchor screw means located in the ground, said cable spool means being connected to one another by friction clutch means to enable differential spooling and unspooling, said cable spool means being driven by a drum drive shaft means to unwind and wind cable from and to said cable spool means depending on the direction of rotation of said drum drive shaft means;

ratchet clutch means fixedly mounted on one of said drive shaft means for driving said climbing ball roller means; and sprocket and chain means connecting said one drive shaft means and said drum drive shaft means; whereby stabilizing cable means are payed out and taken up when said hunter's blind is raised and lowered depending on the direction of rotation of said one drive shaft means.

5. A portable hunter's blind as in claim 4, said operating means comprising:

a primary gearbox means located inside said hunter's blind to be accessible to the user, said primary gearbox means comprising a pair of cooperating gear means mounted on one end of support shaft means, and sprocket means mounted on a second end of said support shaft means;

said actuating means comprising driving means for driving said cooperating gear means, said actuating means being operable from within the hunter's blind;

sprocket means connected to an end of each drive shaft means for driving said climbing ball roller means; and chain means connecting said sprocket means on said second end of said support shaft means and said end of said drive shaft means for driving said climbing ball roller means; whereby raising and lowering of said hunter's blind also controls the deployment of the stabilizing cable means.

6. A portable hunter's blind as in claim 5, wherein said actuating means for driving said cooperating gear means comprises a manually operated crank means.

7. A portable hunter's blind as in claim 5, wherein said actuating means for driving said cooperating gear means comprises a motor means.

8. A portable hunter's blind as in claim 1, wherein said window means includes slidable transparent windows whereby a user can be protected from the elements.

9. A portable hunter's blind as in claim 1, further comprising a chair means mounted inside the hunter's blind.

10. A portable hunter's blind as in claim 4, wherein:

said cable spool means are rotatable and longitudinally slidable on said drum drive shaft means;
said friction clutch means means are connected to said drum drive shaft means to rotate with said drum drive shaft means and to slide longitudinally of said drive shaft means;
said cable spooling drum means further comprising a cable spool clutch pressure adjustment means; whereby
said cable spool means are underdriven during pay-out of said cable means and are overdriven during take-up of said cable means, to thereby maintain tension on said cable means both when raising said hunter's blind and when lowering said hunter's blind.

* * * * *